United States Patent [19]
Breezer et al.

[11] Patent Number: 5,050,341
[45] Date of Patent: Sep. 24, 1991

[54] THERMOPLASTIC AQUATIC BIOMASS CONTAINMENT BARRIER WITH REINFORCED HINGE

[75] Inventors: Harlon W. Breezer; William F. Price, both of Portage, Wis.

[73] Assignee: Penda Corporation, Portage, Wis.

[21] Appl. No.: 518,014

[22] Filed: May 2, 1990

[51] Int. Cl.5 .............................................. A01G 7/00
[52] U.S. Cl. .......................................... 47/59; 47/1.5; 47/85; 47/58
[58] Field of Search .............................. 47/1.5, 85, 59

[56] References Cited

U.S. PATENT DOCUMENTS

| | | | |
|---|---|---|---|
| Re. 28,966 | 9/1976 | Blockwick | 405/70 |
| 3,164,110 | 1/1965 | Bofinger . | |
| 3,281,301 | 10/1966 | Bolesky . | |
| 3,330,228 | 6/1967 | Donnelly . | |
| 3,462,330 | 8/1969 | Greig et al. . | |
| 3,467,032 | 9/1969 | Rowlands et al. . | |
| 3,628,468 | 12/1971 | Angelbeck, Jr. . | |
| 3,640,229 | 2/1972 | Bell . | |
| 3,680,496 | 8/1972 | Westlake, Jr. . | |
| 3,687,764 | 8/1972 | Rogosch et al. . | |
| 3,699,902 | 10/1972 | Allgeyer et al. . | |
| 3,717,922 | 2/1973 | Witkowski . | |
| 3,737,496 | 6/1973 | Voorhees, Sr. . | |
| 3,911,514 | 10/1975 | Ito | 47/59 |
| 3,935,358 | 1/1976 | Wyeth et al. . | |
| 3,954,923 | 5/1976 | Valyi . | |
| 4,068,478 | 1/1978 | Meyers et al. | 405/66 |
| 4,118,261 | 10/1978 | Pedler . | |
| 4,157,415 | 6/1979 | Linderberg . | |
| 4,175,315 | 3/1979 | Hayes, Sr. et al. . | |
| 4,192,701 | 3/1980 | Martin et al. . | |
| 4,382,348 | 5/1983 | Kitsu et al. . | |
| 4,428,306 | 1/1984 | Dresen et al. . | |
| 4,490,884 | 1/1985 | Vickers . | |
| 4,536,988 | 8/1985 | Hogen | 47/85 |
| 4,545,090 | 10/1985 | Redmond . | |
| 4,637,909 | 1/1987 | Lucca . | |
| 4,788,088 | 11/1988 | Kohl . | |
| 4,790,972 | 12/1988 | Coffman . | |
| 4,818,579 | 4/1989 | Uchida | 47/59 |
| 4,991,343 | 2/1991 | Wait | 47/1.5 |

OTHER PUBLICATIONS

Lemna, The New Alternative WasteWater Treatment—Lemna Corporation, Mendota Heights, Water Treatment—Lemna Corporation, Mendota Heights, Minnesota.
*Operations Forum*, vol. 4, No. 8, Aug. 1987 "Boosting Pond Performance With Aquaculture," Viet Ngo.

*Primary Examiner*—David A. Scherbel
*Assistant Examiner*—Joanne C. Downs
*Attorney, Agent, or Firm*—Lathrop & Clark

[57] ABSTRACT

A twin-sheet thermoformed thermoplastic aquatic biomass containment barrier with reinforced hinges is disclosed having a formed first extended linear thermoplastic sheet member which is fused to a formed second linear extended thermoplastic sheet member of substantially the same dimensions as the first member to form a composite unit member having two ends and air pockets formed between the two sheets to give buoyancy to the segment. Reinforcing thermoplastic inserts are located between the first and second members at each end of the composite member. Each insert has portions defining a central pinhole and is fused to the first and second members to form reinforced hinged sections. The hinged segments may be connected by pins to form a floating aquatic biomass containment barrier cell or a network of cells. Such a network is effective for the growth and harvesting of small aquatic plants such as the duckweed plant.

12 Claims, 4 Drawing Sheets

THERMOPLASTIC AQUATIC BIOMASS CONTAINMENT BARRIER WITH REINFORCED HINGE

FIELD OF THE INVENTION

This invention relates generally to a floating barrier network to be used to contain aquatic plants, and in particular to a thermoformed thermoplastic barrier having reinforced hinges.

BACKGROUND OF THE INVENTION

Floating aquatic plants such as the plants of the duckweed family have the capability of rapidly taking up nutrients from an aquatic environment to provide a food source with a high nutritional and protein content. When grown on the surface of a waste water treatment pond, duckweed serves an important water purification purpose while producing a harvestable feed crop. However, in order to enable efficient commercial utilization of the duckweed species it must be capable of being utilized in large bodies of water. A floating aquatic plant does not attach itself to the bottom of the pond or other body of water on which it is growing and is subject to wave action when grown on the surface of large bodies of water. The wave action will push the aquatic plants to a localized area, causing the destruction of the plants and reducing their growth and reproduction efficiency as the surface contact with the nutrients in the water is reduced. To maximize the growth and reproduction of the floating aquatic plants it is essential that they be evenly dispersed over the surface of the water to maximize their surface contact with the water.

An aquatic biomass containment barrier is disclosed in U.S. Pat. No. 4,536,988 incorporated by reference herein. This containment barrier operates to reduce the effect of wave action on the small plants by dividing the surface of the body of water into a large number of relatively small surface area compartments divided by flexible, buoyant plastic sheets formed into a network of rectangular compartments and held together by metallic clips. The duckweed are harvested by submerging the buoyant barriers beneath a common weed harvester.

To provide a barrier system which is more resistant to environmental conditions and repeated harvestings, and which may be rapidly deployed and taken in, it would be advantageous to form a barrier from a plurality of identical horizontally extending sturdy plastic parts.

These horizontally extending plastic barrier members should be joined to one another by pin-connected hinges for maximum resilience of the barrier network. However, due to the long moment arms of the barrier members and the repeated and high intensity loads placed on them, the hinges must be able to withstand significant loads.

All-plastic hinges are well known to the art. Plastic hinges are typically formed by an injection molding process since it is necessary to achieve thickened portions of the hinges at the hinge knuckle as compared to the hinge leaves. Injection molding, while suitable for small parts, is inordinately expensive for very large articles of manufacture such as a barrier member which is typically on the order of six to ten feet long.

The twin-sheet thermoforming process is a cost effective method of producing large plastic parts. Twin-sheet thermoformed articles, however, are normally limited to either a single or a double thickness wall at any point on the article. Unreinforced twin-sheet thermoformed parts cannot economically form hinged knuckles of sufficient strength to bear the necessary loads of an aquatic biomass containment barrier. Under the prior art metal or plastic hinges formed by some other process must be attached with fasteners to the thermoformed article.

There is a need for an economical, one-piece, all-plastic containment barrier member which may be hingedly connected into a network for raising and harvesting floating aquatic plants.

SUMMARY OF THE INVENTION

A floating aquatic biomass containment barrier of this invention is composed of a plurality of containment barrier segments. Each segment has a first extended linear thermoplastic sheet member formed to the shape of one side of the segment and a second linear thermoplastic sheet member of substantially the same dimensions as the first member and formed to the shape of the other side of the segment. The first and second members are fused together to form a composite unit member having two ends. The composite unit member has air pockets formed between the first member and the second member to give buoyancy to the segment. Reinforcing inserts are located between the first and second members at each end of the composite unit member. Each insert has portions defining a central pinhole and is formed to occupy the space between the first member and the second member at each end and is fused to the first and second members to form a reinforced hinge section. Three or more segments may be pin-connected together through the pinholes of the hinge sections to form a closed floating aquatic biomass containment barrier. A network of containment barriers extending to cover any desired body of water is formed by joining a plurality of containment barrier segments to form a network of cells adapted to restrain floating aquatic biomass.

It is an object of this invention to provide a floating aquatic biomass containment barrier network formed of substantially identical thermoplastic segments which may be pin-connected.

It is also an object of this invention to provide a reinforced hinge for a twin-sheet thermoformed containment barrier segment that will allow compact stacking of connected segments.

It is a further object of this invention to provide a composite thermoplastic member with reinforced hinge sections.

It is an additional object of this invention to provide a reinforced twin-sheet thermoformed hinge for a thermoplastic member which may be easily recycled.

Further objects, features, and advantages of the invention will be apparent from the following detailed description when taken in conjunction with the accompanying drawings.

DESCRIPTION OF THE PREFERRED EMBODIMENT

Figure 3:
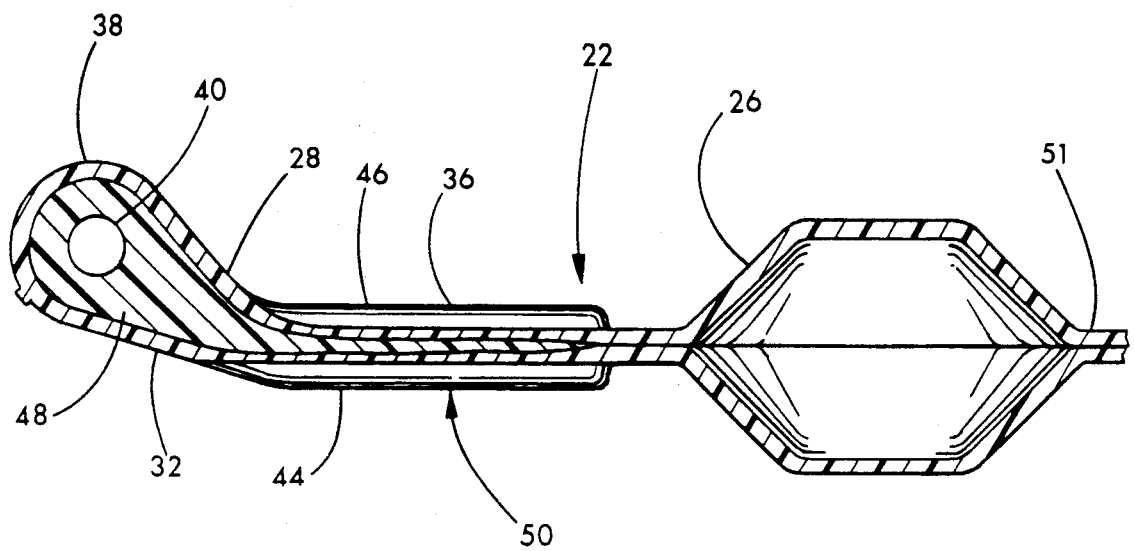
FIG. 3 is a partial sectional view taken along section line 3—3 of the barrier segment of FIG. 1.
Figure 4:
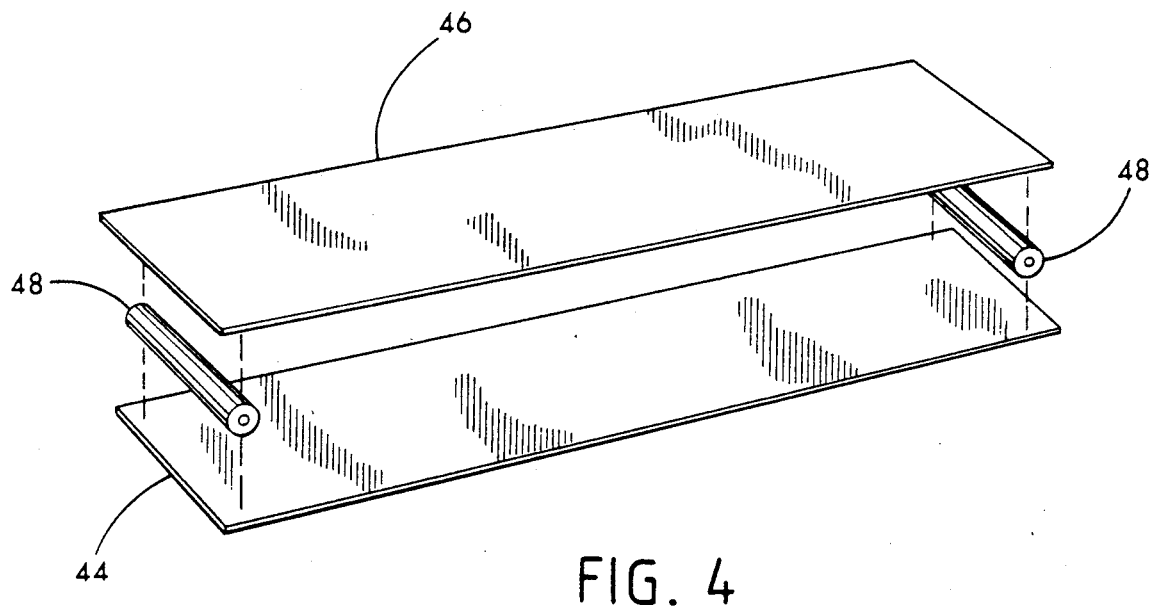
FIG. 4 is an exploded perspective view of the four thermoplastic components of a composite barrier segment in their unfused, unmolded condition.
Figure 5:
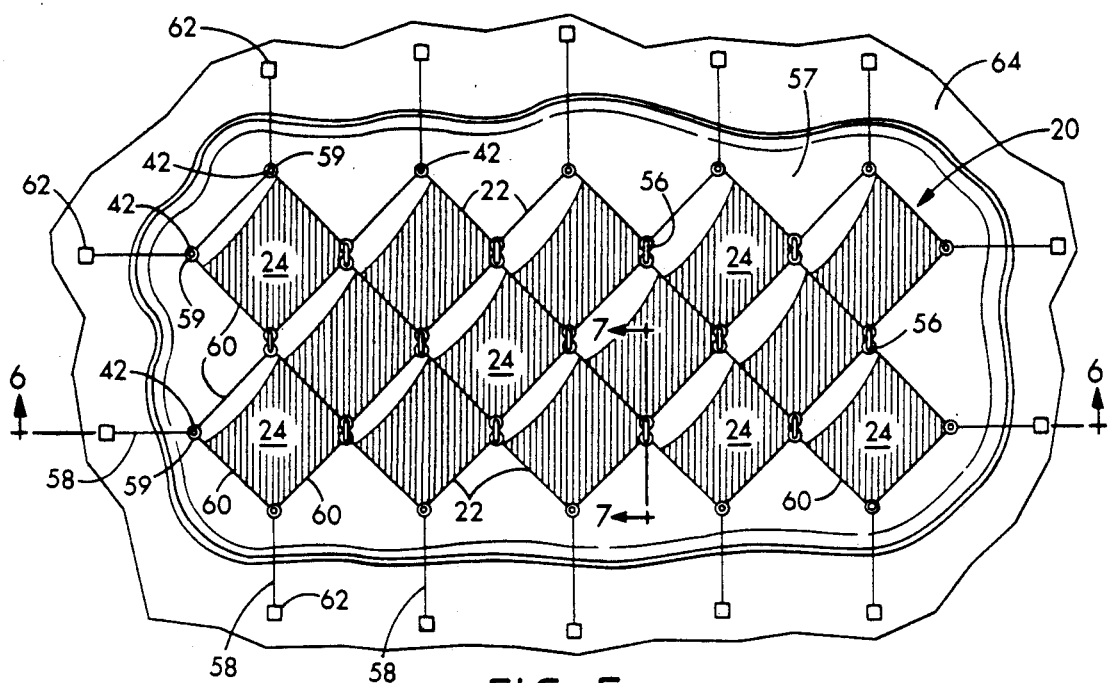
FIG. 5 is a schematic view of a network of containment barriers.
Figure 6:
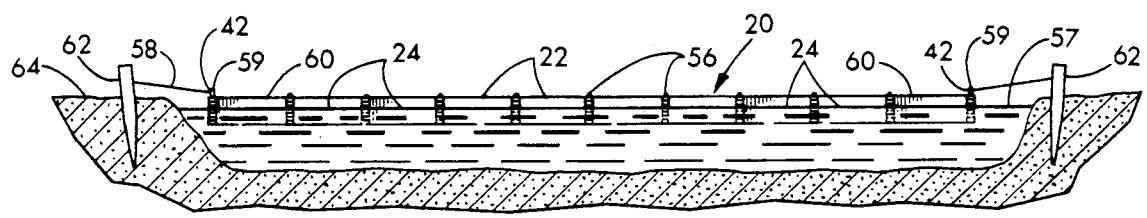
FIG. 6 is a sectional view taken along section line 6—6 of FIG. 5.
Figure 7:
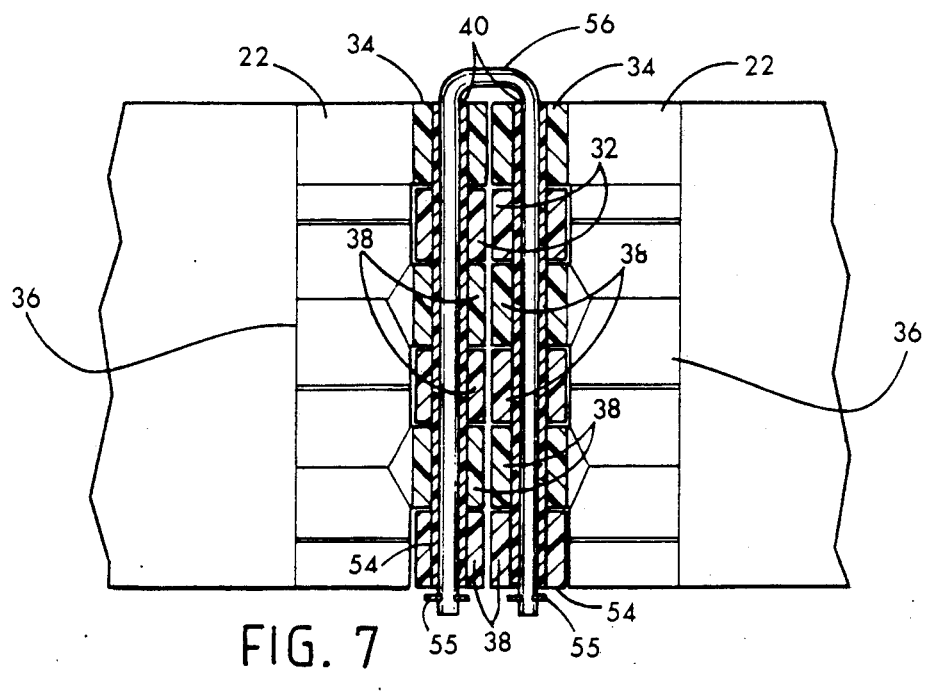
FIG. 7 is a fragmentary sectional view of a joint of the network of FIG. 5 taken along section line 7—7.

Referring more particularly to FIGS. 1-8 wherein like numbers refer to similar parts, a floating containment barrier network 20 is shown in FIGS. 5 and 6. The containment barrier network 20 is assembled from a plurality of containment barrier segments 22 shown in FIGS. 1-3. The containment barrier network is adapted to float on the surface of a body of water to contain large populations of small aquatic plants 24 within particular cells of the network 20.

The plants 24, when grown on the surface of the water concentrate unwanted nutrients in the plant material. By harvesting the plants, the unwanted nutrients may be removed from the water. While the containment barrier network 20 may be used to contain any floating aquatic plants, it is particularly adapted to use in containing a species of the duckweed family (Lemna minor) which is particularly suited to waste water treatment and harvesting as a cash crop because of its rapid growth rate, capacity for high concentration of phosphorus and nitrogen, and its potential protein content of 40 to 45 percent.

Figure 1:
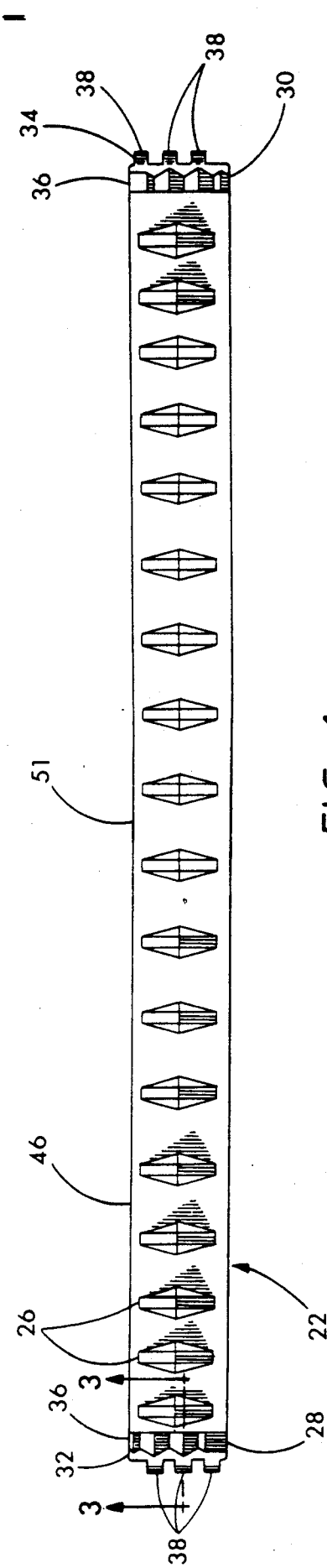
FIG. 1 is a side elevational view of a barrier segment of the floating aquatic biomass containment network of this invention.
Figure 2:
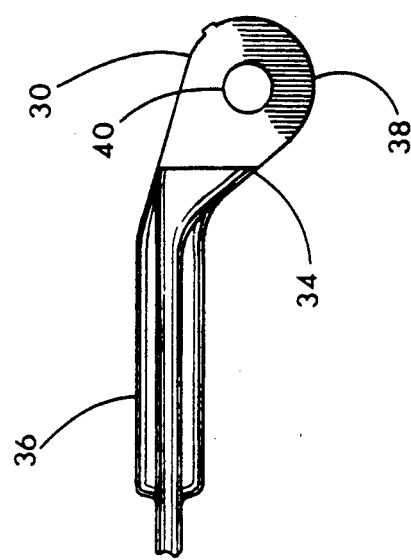
FIG. 2 is a top plan view of the barrier segment of FIG. 1.
Figure 2:
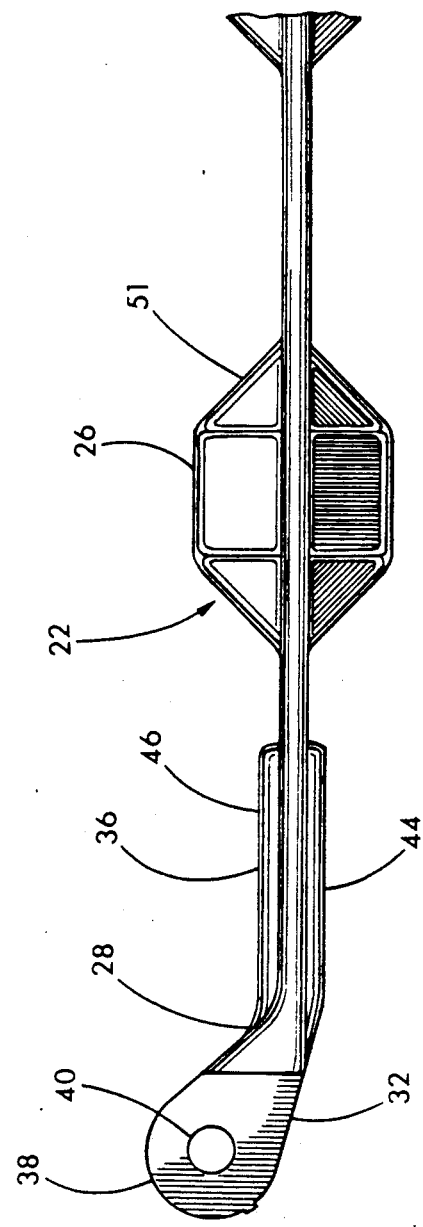

The containment barrier segments 22 which make up the containment barrier network 20 are shown in FIGS. 1-3. Each segment 22 is significantly longer than it is tall. Each segment 22 has a number of air pockets 26 which enable the segment 22 to float partially above the surface of the water. The air pockets 26 are more closely spaced near the ends 28, 30 of the barrier segment 22 than in the intermediate section 51 of the barrier segment 22. The increasing distance between the air pockets towards the center of the segment adds to the stability of the segment in the water. The increased buoyancy of the segment 22 towards the ends 28, 30 created by the more closely spaced air pockets 26 counteracts the tendency of the barrier segment ends 28, 30 to bend downwardly when the segment 22 is in the water.

The ends 28, 30 of each segment 22 are reinforced sections which contain thickened hinge sections 32 and 34. The hinge sections 32, 34 have a reinforced stiffened portion 36 and at least one, but preferably three, hinge knuckles 38. The hinge knuckles 38 protrude outwardly from the stiffened portion 36 and have a central pinhole 40 running through each knuckle 38 and aligned with the pinholes 40 of the other knuckles 38. The pinholes 40 are spaced approximately one half the height of the air pockets 26 from the plane of the segment 22.

As best shown in FIG. 2, the hinge knuckles 38 on the opposite ends 28, 30 project away from the stiffened portions 36 in differing directions so that the hinge sections 32, 34 have knuckles which project on opposite sides of the segment 22 which facilitates connection of multiple segments into a network 20 as described more fully below. The hinge knuckles 38 are formed on the ends 28, 30 of a first segment 22 so that a second segment 22 may be positioned adjacent the first segment so that the hinge knuckles 38 of the two segments will mesh to form a hinge wherein they may be joined by a hinge pin. As best seen in FIG. 1 the three protruding hinge knuckles 38 in the left hinge section 32 of the segment 22 are offset in relation to the hinge knuckles 38 of the right hinge section 34 so that the hinge knuckles of one barrier segment 22 may engage the hinge knuckles of a second aligned barrier segment 22.

Although the dimensions of the segment 22 may be varied, the height of each segment must be sufficient to prevent waves from over-lapping the top of the barrier. It has been shown that a segment 10 feet long and 9 inches tall fulfills this requirement.

A thermoplastic article of the dimensions of a containment barrier segment 22 is most economically produced by a process of twin-sheet thermoforming. In this process a number of thermoplastic members are fused under heat and pressure to form a single composite unit member with the desired structural properties. The four thermoplastic members 44, 46, 48 which make up a single containment barrier segment 22 are shown in FIG. 4. These members, which are of any appropriate thermoplastic material, preferably high density polyethylene, will be molded and fused together to form a containment barrier segment. The thickness of the linear members 44, 46 will depend on the desired dimensions of the final article, but is typically about 0.10 inch.

As in the well known twin-sheet thermoforming process, a first extended linear thermoplastic sheet member 44 and a second linear thermoplastic sheet member 46 of substantially the same dimensions as the first member 44 are heated separately until they have reached the desired plastic state. The first member 44 is then drawn into a metallic vacuum-forming mold which draws the heated thermoplastic material into the shape of one-half of the containment barrier segment 22. The second member 46 is immediately drawn into a second vacuum forming mold positioned directly above the formed first member 44. In a common twin-sheet thermoforming process the first and second sheets would be pressed together while hot to form a fused composite unit member. However, an article formed in the standard manner, from first and second thermoplastic members of 0.10 inch thickness, would have hinge knuckles and hinge sections of at most about 0.20 inches. Hinge knuckles of that thickness would not be sufficiently thick to permit pinholes to be drilled therein which would accept hinged pins of sufficient diameter to securely unite the hinged barrier segments 22. Furthermore, the plastic surrounding the pinholes would be insufficiently thick to support the large forces exerted on the hinge knuckles.

Reinforcement for the hinge sections 32, 34 which contain the stiffened portions 36 and the hinge knuckles 38 is provided by two reinforcing thermoplastic inserts 48. The reinforcing inserts 48 are preferably formed of the same thermoplastic material as the sheet members 44, 46. The barrier segment 22 is thus formed entirely of a common plastic and may easily be recycled. The reinforcing inserts are heated to the appropriate plastic condition and located between the first sheet member 44 and the second member 46 while those members are still hot within the vacuum molds. A reinforcing thermoplastic insert 48 is located at each end of the barrier segment 22 and is fused between the first and second members 44, 46 by the application of pressure to the two formed members. This pressure is applied by pressing the second member 46 within its mold onto the first member 44 and the reinforcing inserts 48 within the first member's mold and holding the molds together for a sufficient time to fuse the separate parts, usually about 100 seconds. The insert 48 is formed by the sheets within the molds to occupy the space between the two sheets. After the first and second members 44, 46, and the reinforcing inserts 48 have been fused together, the molds are cooled and separated and the composite unit member 50 with reinforced hinge sections 32, 34 is removed from the molds. Once the composite unit member 50 has been fully cooled it is trimmed to final size, and routed to form the hinge knuckles 38. The pinholes 40 are drilled through the hinge knuckles 38.

As shown in FIG. 3, the hinge sections 32, 34 are substantially thicker than the intermediate portions 51 of the containment barrier segment 22. Each hinge section has a stiffened portion 36 and hinge knuckles 38 which are the composite of three pieces of thermoplastic material. Each stiffened portion 36 comprises a series of connected inclined planar surfaces of alternating inclination which are formed by the upper and lower planar members 46, 48. The space between the upper and lower members at the stiffened portions 36 may be filled with thermoplastic material from the reinforcing insert 48 pushed between the sheet members by the molding process. The disposition of the reinforcing insert 48 is best shown in the sectional view of FIG. 3. To the eye, however, the hinge sections will appear to be of one continuous piece as shown in the top plan view of FIG. 2. This composite barrier segment 22 provides significantly thickened and strengthened hinge sections while requiring no more than the minimum amount of plastic material for the intermediate portions 51.

A single containment barrier cell 52 may be assembled from any even number of containment barrier segments 22 greater than two. The walls of the containment barrier cell 52 act like breakwaters to prevent large waves from forming within the cell. The maximum wave height which may form within a cell is a function of the linear measure of space that the wind may blow over to create waves. For ease of assembly, square or diamond-shaped cells such as those shown in FIG. 5 are preferable. To form a single four-sided cell 52, four containment barrier segments 22 may be joined to one another by straight pins 42 connecting the hinge section 32 of one segment 22 to the hinge section 34 of an adjoining segment 22 until a closed barrier is formed.

To cover a pond, however, more than one cell 52 will be needed. To cover a large surface of water a containment barrier network composed of many four-sided cells will be necessary. A network may be formed by clipping together a desired number of four-sided containment barrier cells 52. However, a network 20 is preferably formed as shown schematically in FIG. 5 by utilizing U-shaped hinge pins 56 to hingedly connect a series of barrier segments 22 in a pattern of four-sided cells. The hinges are shown disproportionately large for greater clarity in FIG. 5. In a preferred form the pinholes 40 in the hinge knuckles 38 will be approximately ⅜ of an inch in diameter. To form a network 20, the containment barriers 22 are positioned adjacent one another to form a network of four-sided cells. The hinge knuckles 38 of adjacent segments 22 are meshed and a snuggly-fitting tubular plastic sleeve 54 is inserted in the pinhole 40. This sleeve has an inner diameter of approximately ¼ inch and is preferably formed of polyethylene plastic. Where only two barrier segments 22 are joined, as at the anchor points 59 of the network 20, straight pins 42 are used to connect the segments. The straight pins 42 are inserted through the plastic sleeves 54 and held in place by C-clips 55.

Throughout the interior of the network, where four barrier segments 22 come together, the barrier segments 22 are joined by U-shaped hinge pins 56. As best shown in the detail section view of FIG. 7, the hinge knuckles 38 of the four barrier segments 22 are meshed to form two sets of two hinged barrier segments 22. Each arm of the U-shaped hinge pin 56 is inserted through a plastic sleeve 54 which has been inserted in the hinge knuckles 38. The U-shaped hinge pin 56 is held in place by two C-clips 55.

Additional barrier segments 22 may be added to the network 20 to form a series of square or diamond-shaped cells covering as large a portion of the body of water 57 as is desired. Many hundreds of barrier segments 22 may be needed to cover a water treatment pond. Because of the extensive size of the network it is important that the barrier segments 22 be able to rotate about their hinge pins. With this rotational freedom the individual cells may change shape slightly to accommodate forces exerted anywhere on the network.

At the limits of the network 20 stays 58 of metallic cable or other water resistant cable connect to the anchor points 59 of the peripheral segments 60 to stakes 62 secured to the shore 64 or the bottom of the body of water. The stays 58 act to retain the network 20 in its proper shape.

As shown in FIG. 6, the network 20 floats on the surface of the water partially submerged. To harvest the duckweed plants a shallow-draft weed harvester proceeds over the network submerging individual cells and harvesting the duckweed which remains on the surface.

Figure 8:
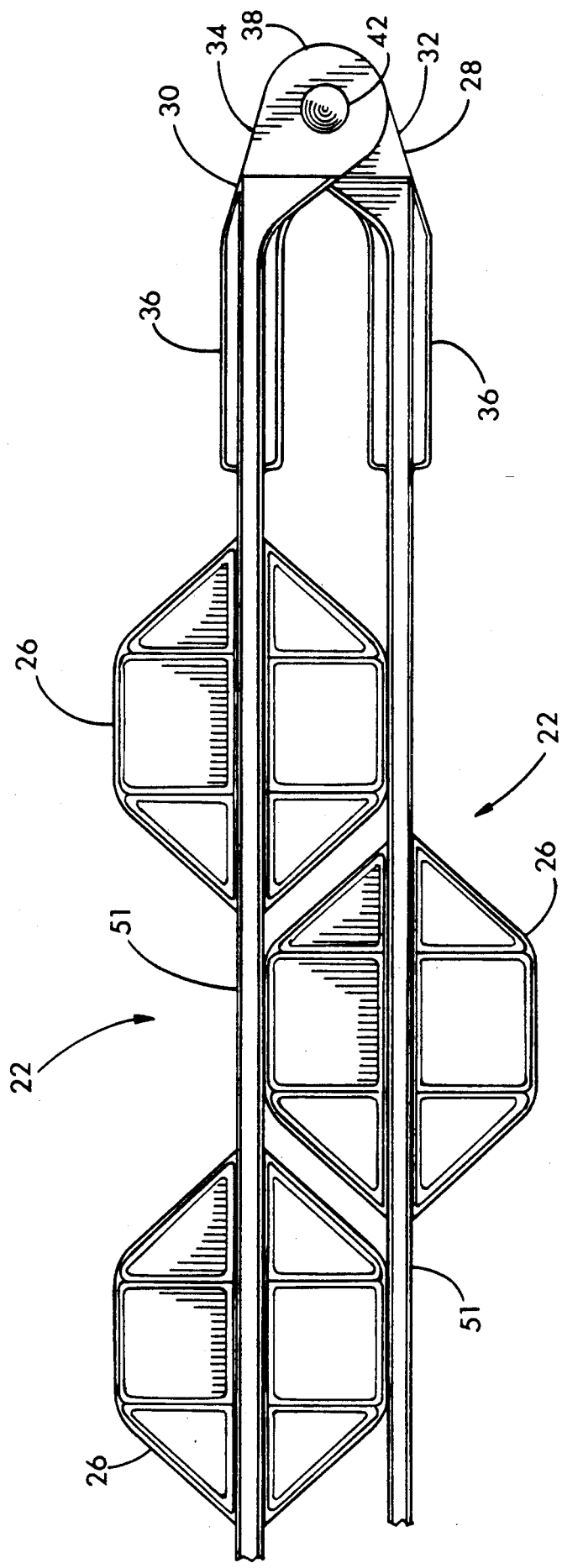
FIG. 8 is a fragmentary side view of two pin-connected barrier segments of FIG. 1 stacked in an undeployed configuration.

When it is desired to store the containment barrier segments 22 prior to deployment in a pond or after removal from a body of water, the containment barrier segments 22 may be compactly folded to lie against one another as shown in FIG. 8. The left end 28 of one segment 22 is connected to the right end 30 of a second segment 22 by interengaging the hinge knuckles 38 of the hinge sections 32, 34 of the two barrier segments 22. Since the hinge sections 32, 34 of each segment 22 protrude beyond the plane of the composite unit member 50, the hinge knuckles 38 of the two segments 22 may remain pin-connected while the two segments are folded to overlie one another. The protrusions in the containment barrier segments 22 which form the air pockets 26 are spaced so as to fit between the protruding portions surrounding the air pockets 26 of the connected segment 22. Any desired number of segments 22 may be connected in this way with the left end of one segment 22 being connected to the right end of the previous segment. In this way, a large number of containment barrier segments 22 may be stored in a compact space.

The containment barrier segments may be formed with more hinge knuckles 38 than shown. The reinforcing thermoplastic inserts need not be cylindrical or hollow but may be rectangular or any other extruded or cut shape. Although it is preferred that the thermoplastic material used in the first and second linear members be the same as the thermoplastic from which the reinforcing insert is formed, it is not necessary. In some applications, it may be desirable to utilize a different thermoplastic for the reinforcement to achieve hinged sections with composite plastic properties.

It should be noted that the reinforced hinge sections 32, 34 may be formed on twin-sheet thermoformed articles other than containment barrier segments. The protruding hinge knuckles would enable the hinge sections to be molded onto any shaped article.

It is understood that the invention is not confined to the particular construction and arrangement of parts herein illustrated and described, but embraces such modified forms thereof as come within the scope of the following claims.

I claim:

1. A buoyant twin-sheet thermoformed segment for an aquatic biomass containment barrier comprising:
    (a) a first extended linear thermoplastic sheet member having a shape defining one side of the segment;
    (b) a second linear thermoplastic sheet member of substantially the same dimensions as the first member having a shape defining the other side of the segment and fused to the first member to form a composite unit member having two ends, wherein the composite unit member has at least one air pocket formed between the first member and the second member to give buoyancy to the segment;
    (c) reinforcing thermoplastic inserts located between the first and second members at each end of the composite unit member, wherein each insert is formed to occupy the space between the first member and the second member at each end and is fused to the first and second members to form unitary reinforced hinge sections of increased strength and thickness, the hinge sections having at least one protruding hinge knuckle.

2. The segment of claim 1 wherein the hinge sections protrude beyond the plane of the composite unit member, such that one hinge section protrudes above the composite unit member and the other hinge section protrudes below the composite unit member such that a plurality of segments may be pin connected through pin holes in the protruding hinge knuckles of the hinge sections and compactly folded to lie against one another.

3. A first and a second barrier segment as in claim 2, wherein the hinge sections are interengaged and the pockets are located along the first and second members and are surrounded by protruding portions of the sheet members so that the first segment may be rotated about the pin connecting the hinge segments to overlie the second segment and the protruding portions of the first segment may fit between the protruding portions surrounding the air pockets of the second segment.

4. The segment of claim 1 wherein each reinforced hinge section comprises a portion of increased stiffness wherein the first and second sheet members are formed into a series of connected inclined planar surfaces of alternating inclination.

5. The barrier segment of claim 1 further comprising a plurality of air pockets formed between the first and second members and spaced along the length of the segment wherein the distance between air pockets increases towards the center of the segment.

6. A floating aquatic biomass containment barrier cell comprising:
    (a) at least three twin-sheet thermoformed containment barrier segments, each segment having a first extended linear thermoplastic sheet member and a second extended linear thermoplastic sheet member of substantially the same dimensions as the first member fused together to form a composite unit member having two ends, and having reinforcing thermoplastic inserts located between the first and second members at each end and fused to the first and second members to form unitary reinforced hinge sections, wherein each hinge section has at least one protruding hinge knuckle having portions defining a pin hole, wherein the containment barrier segments are joined end-to-end by interconnected hinge knuckles of adjoining segments and wherein hinge pins are inserted through the aligned hinge knuckles to connect the segments to form a closed cell.

7. A network of floating aquatic biomass containment barriers, comprising:
    (a) a plurality of twin-sheet thermoformed containment barrier segments, each segment having a first extended linear thermoplastic sheet member and a second extended linear thermoplastic sheet member of substantially the same dimensions as the first member fused together to form a composite unit member having two ends, with reinforcing thermoplastic inserts located between the first and second members at each end with each insert fused to the first and second members to form reinforced hinge sections, wherein the hinge sections have a protruding hinge knuckle with portions defining a pinhole; and
    (b) wherein the segments are joined to form a network of cells with at least three sides adapted to restrain a floating aquatic biomass.

8. A twin-sheet thermoformed composite hinge member, comprising:
    (a) a first thermoplastic sheet member;
    (b) a second thermoplastic sheet member fused to the first member to form a composite unit member;
    (c) a thermoplastic insert located between and fused to the first and second members at one end of the composite unit member to form a reinforced hinge section wherein the hinge section has at least one extended, increased thickness, hinge knuckle.

9. The hinge member of claim 8 wherein the hinge section has at least two extended, increased thickness hinge knuckles spaced from one another so as to mesh with at least one hinge knuckle of a second composite member, wherein the hinge knuckles of each composite member have portions defining aligned pinholes.

10. A pair of interengaging hinge members as in claim 9 wherein each hinge member has three protruding knuckles and the hinge knuckles of one hinge member are offset in relation to the hinge knuckles of the other hinge member to permit the hinge knuckles of one hinge member to engage the hinge knuckles of the aligned other hinge member.

11. The hinge member of claim 8 wherein the reinforced hinge section comprises a portion of increased stiffness having a series of connected planar surfaces of alternating inclination formed by the first and second sheet members.

12. The hinge member of claim 8 wherein the reinforced hinge section protrudes above the plane of the composite unit member.

* * * * *